(12) United States Patent
Wuenning

(10) Patent No.: US 7,413,436 B2
(45) Date of Patent: Aug. 19, 2008

(54) DRIVING APPARATUS FOR ROLLERS OF ROLLER HEARTH FURNACES AND ROLLER HEARTH FURNACE

(75) Inventor: Joachim A. Wuenning, Leonberg (DE)

(73) Assignee: Rollmod Hochtemperatur-Transportsysteme GmbH, Renningen (DE)

( * ) Notice: Subject to any disclaimer, the term of this patent is extended or adjusted under 35 U.S.C. 154(b) by 118 days.

(21) Appl. No.: 11/404,302

(22) Filed: Apr. 14, 2006

(65) Prior Publication Data

US 2006/0251999 A1   Nov. 9, 2006

(30) Foreign Application Priority Data

Apr. 20, 2005   (DE)   .................. 20 2005 006 587 U

(51) Int. Cl.
*F28F 5/02* (2006.01)
*B21B 27/06* (2006.01)

(52) U.S. Cl. .................. 432/246; 219/469; 492/46
(58) Field of Classification Search .................. 432/60, 432/228, 246; 219/469; 492/15, 46
See application file for complete search history.

(56) References Cited

U.S. PATENT DOCUMENTS

| | | | | |
|---|---|---|---|---|
| 2,135,175 | A | * | 11/1938 | Fallon ................. 432/249 |
| 3,867,748 | A | * | 2/1975 | Miller ................. 432/246 |
| 4,131,420 | A | * | 12/1978 | Miller ................. 432/246 |
| 4,205,746 | A | * | 6/1980 | Olson et al. ............ 198/791 |
| 4,330,268 | A | | 5/1982 | Kremheller et al. |
| 4,337,035 | A | | 6/1982 | Barchi |
| 5,007,826 | A | | 4/1991 | Wiinning |
| 5,244,081 | A | * | 9/1993 | Kajii et al. ............ 198/790 |
| 5,360,100 | A | * | 11/1994 | Bourgeois ............ 198/790 |
| 5,848,890 | A | | 12/1998 | McCormick |

FOREIGN PATENT DOCUMENTS

| | | |
|---|---|---|
| DE | 21981 | 3/1958 |
| DE | 29 47 540 C3 | 5/1981 |
| DE | 30 06 114 A1 | 9/1981 |
| DE | 31 40 644 A1 | 6/1982 |
| DE | 30 34 833 C2 | 11/1982 |
| DE | 203 16 236 U1 | 2/2004 |

(Continued)

OTHER PUBLICATIONS

German Search Report dated Jan. 17, 2006 (4 pages).

(Continued)

*Primary Examiner*—Gregory A Wilson
(74) *Attorney, Agent, or Firm*—Flynn, Thiel, Boutell & Tanis, P.C.

(57) ABSTRACT

A driving apparatus for rollers of roller hearth furnaces includes a bearing beam module having a mounting plate for fixing to a side wall of the roller hearth furnace. The mounting plate has at least one passage opening for receiving a drive journal for driving one of the rollers. At least one mitre gear unit fixed to the mounting plate is provided and its angle drive is connected by the drive journal to the roller to be driven. At least one first and one second rotary coupling piece are accessible from the outsides of a casing of the mitre gear unit and are provided for connecting the angle drive to two further mitre gear units for driving in each case one adjacent roller.

17 Claims, 5 Drawing Sheets

FOREIGN PATENT DOCUMENTS

| | | |
|---|---|---|
| EP | 0 260 937 B1 | 3/1988 |
| EP | 0 335 216 A1 | 10/1989 |
| EP | 0 342 343 A2 | 11/1989 |
| EP | 0 342 343 B1 | 11/1989 |
| GB | 2 041 179 A | 9/1980 |
| JP | 59124607 A | 7/1984 |
| JP | 08110167 A | 4/1996 |
| JP | 10025023 A | 1/1998 |
| JP | 2000146449 A | 5/2000 |

OTHER PUBLICATIONS

European Patent Office Search Report dated Jan. 23, 2008 (6 pages).

\* cited by examiner

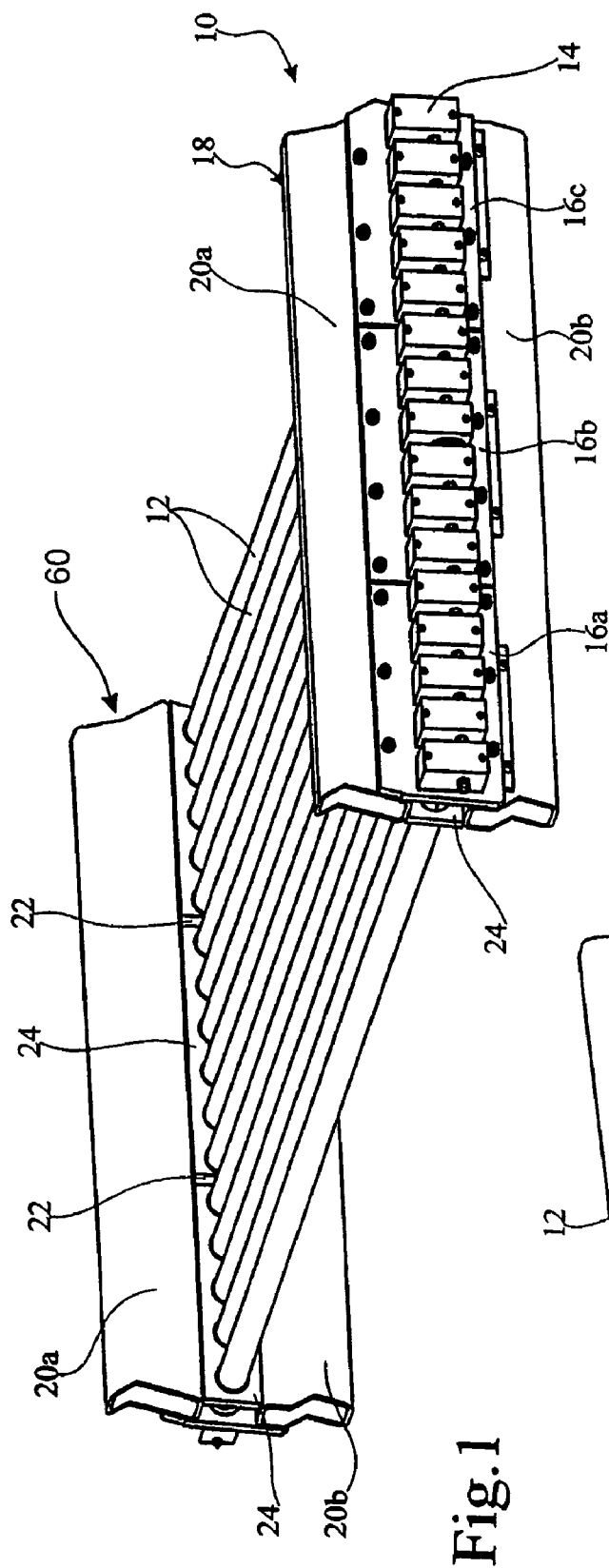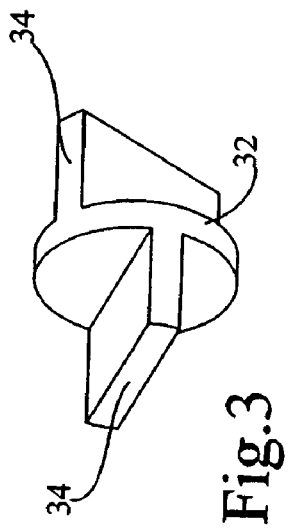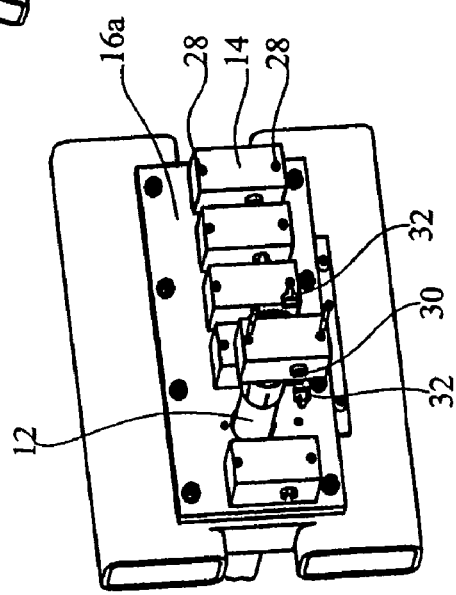
Fig.1
Fig.3
Fig.2

DRIVING APPARATUS FOR ROLLERS OF ROLLER HEARTH FURNACES AND ROLLER HEARTH FURNACE

FIELD OF THE INVENTION

The invention relates to a driving apparatus for rollers of roller hearth furnaces with a bearing beam module having a mounting plate for fixing to one side wall of the roller hearth furnace, the mounting plate having at least one passage opening for receiving a drive journal for driving one of the rollers.

BACKGROUND OF THE INVENTION

European patent EP 3 42 343 B1 discloses a roller hearth furnace for the heat treatment of small metal and ceramic parts, in which a roller conveyor is constructed from several, juxtaposed rollers. The ends of said rollers are connected to journals, which are mounted in each case one bearing beam module at both ends of the rollers. There are e.g. five rollers mounted on either side in in each case one bearing beam module. On the drive side the bearing beam has devices for receiving the drive journals of rollers and is located within a side wall of the roller hearth furnace. The rollers of a bearing beam module can be adjusted through the adjustment of the bearing beam relative to the side wall. The bearing beam module can be disassembled in its entirety from the roller hearth furnace. The solution described therein is particularly advantageous for furnaces having a roller spacing of less than 50 mm. However, the rollers cannot be individually replaced.

The problem of the invention is to provide a driving apparatus for rollers of roller hearth furnaces, which permits in an easy manner the removal of individual rollers. In addition, a driving apparatus is to be provided, which can be sealed without difficulty against gas losses of the roller hearth furnace.

SUMMARY OF THE INVENTION

To this end the invention provides a driving apparatus for rollers of roller hearth furnaces with a bearing beam module having a mounting plate for fixing to a side wall of the roller hearth furnace, the mounting plate having at least one passage opening for receiving a drive journal for driving one of the rollers, in which there is at least one mitre gear unit fixed to the mounting plate and whose angle drive is connected by the drive journal to the roller to be driven and which also has at least one first and one second rotary coupling piece, which are accessible from the outsides of a casing of the mitre gear unit and which are provided for connecting the angle drive to two further mitre gear units for driving in in each case an adjacent roller.

Through the provision of a mitre gear unit for each roller and which is coupled by coupling pieces to adjacent mitre gear units, it is possible to individually dismantle each roller. Removal can take place in a simple manner, because juxtaposed mitre gear units are connected by couplings and consequently the mitre gears do not have to be disassembled during the removal of the rollers. As a result of the provision of a mitre gear unit, whose angle drive is located within a casing, on removing a roller there is no change to the mutual orientation of the components of the angle drive, which avoids distortions in said angle drive as a result of assembly errors.

According to a further development of the invention the first and second rotary coupling pieces are constructed for compensating an angular displacement and/or a linear displacement parallel and perpendicular to the conveying direction in the roller hearth furnace.

As a result it is easily possible to compensate minor alignment errors between the casings of the mitre gear units. Appropriately the casing of the mitre gear unit is displaceable on the mounting plate for adjusting the roller, so that the orientation of each individual roller can be adjusted. This can be particularly important over long conveying distances, because the parts conveyed on the roller conveyor are highly heated in roller hearth furnaces and it must consequently be ensured that the highly heated and consequently sensitive parts do not strike against a side wall of the roller hearth furnace.

According to a further development of the invention the first and second rotary coupling pieces are located on opposite sides of the mitre gear unit casing. Advantageously the first and second rotary coupling pieces are located at the front or rear side in the conveying direction through the roller hearth furnace and it is also advantageous if the first and second rotary coupling pieces are oriented substantially parallel to the conveying direction through the roller hearth furnace.

For the insertion or removal of a mitre gear unit with respect to the driving apparatus, optionally together with the roller, it is consequently only necessary to release or unscrew the couplings and fastening screws of the casing to the mounting plate located on opposite sides of the mitre gear unit casing. Installation can take place in the reverse order and a precise orientation of the mitre gear unit relative to the adjacent mitre gear units is not absolutely necessary as a result of the rotary couplings between the same. In the case of several juxtaposed mitre gear units, with this arrangement there is a drive shaft passing through the roller hearth furnace parallel to the conveying direction and which is in each case formed by rotary couplings between the individual mitre gear units. A drive, e.g. an electric motor, can at an appropriate point be coupled to one of the several mitre gear units, e.g. to the first or last mitre gear unit in a row.

According to a further development of the invention the first rotary coupling piece and second rotary coupling piece have a stub shaft projecting from the mitre gear unit casing and which is slotted centrally and perpendicular to the shaft axis. Advantageously two rotary coupling pieces of adjacent mitre gear units are then connectable by means of a cross coupling piece, which is provided on facing sides projections matching the slots in the rotary coupling pieces.

In this way it is possible in a particularly easy manner to interconnect adjacent rotary coupling pieces through the insertion of a single rotary coupling piece. It is particularly advantageous that all the mitre gear units can be identically constructed. Even when there are numerous rollers, it is possible in this way to provide in large plants up to four hundred conveying rollers within a roller hearth furnace and consequently costs for the mitre gear units can be kept low. Appropriately the projections on the cross coupling piece can be mutually displaced by 90°. This makes it possible to slide the cross coupling piece into the slots of the rotary coupling pieces of the mitre gear units without any further securing action, but the cross coupling piece is still undetachably received between two rotary coupling pieces. In spite of this it is possible to remove a single mitre gear unit, because the slots in the first and second rotary coupling pieces of a mitre gear unit are oriented in parallel.

According to a further development of the invention the drive journal for driving the roller is connected to a gear located in the mitre gear unit casing and meshes with a worm located in the mitre gear unit casing and the ends of said worm are connected to the first rotary coupling piece or the second rotary coupling piece.

As a result the first and second rotary coupling pieces are aligned and this leads to a particularly simple, stable construction of the mitre gear unit with few components. Appropriately the first and second rotary coupling pieces are rigidly connected to the worm, which leads to an inexpensively manufacturable mitre gear unit structure.

The problem of the invention is also solved by a driving apparatus for the rollers of roller hearth furnaces with a bearing beam module having a mounting plate for fixing to a side wall of the roller hearth furnace, the mounting plate having at least one passage opening for receiving a drive journal for driving one of the rollers, in which at least one mitre gear unit fixed to the mounting plate is provided and by means of which the associated free roller end is driven, a casing of the mitre gear unit being constructed in a substantially gastight manner and in an area surrounding the passage opening of the mounting plate is sealed with respect thereto.

In this way the particularly critical sealing of the roller hearth furnace against gas losses in the vicinity of the roller bearing can be displaced into the mitre gear unit casing. Therefore the sealing effect can be displaced into an area cooler than the atmosphere in the roller hearth furnace, so that much lower demands are made on the sealing materials. For example, at the passages of the stub shafts for the rotary coupling pieces radial shaft sealing rings can be provided. However, the roller hearth furnace is still hermetically sealed, because the mounting plate is tightly fitted to the side wall of the roller hearth furnace and also the mitre gear unit casing is connected in gastight manner to the mounting plate. Minor leak quantities may penetrate the mitre gear unit casing, but as the latter is constructed in gastight manner, no gas loss can arise through the casing or the passages of drive shafts. A disadvantageous influencing of the angle drive in the casing can e.g. be prevented in that a grease filling in the casing is regularly replaced within the framework of periodic maintenance.

According to a further development of the invention the free end of the roller is mounted by means of the mitre gear unit. As a result the critical mounting of the roller can take place in the cooler area. For example, the mitre gear units are located outside the roller hearth furnace side wall and are consequently necessarily cooler than this. In order to ensure operability of the angle drive, there is in any case a need for a bilateral mounting of the gears or worms located therein. Therefore the mitre gear unit can, without difficulty, assume responsibility for the mounting of the free end of the roller and due to the bilateral mounting in the mitre gear unit the roller can be received in stress-free manner between its points of support. This is particularly advantageous for ceramic rollers.

According to a further development of the invention the passage opening in the mounting plate has a larger diameter than the roller and the mitre gear unit is constructed in removable manner with the roller.

As a result the individual rollers can be particularly easily removed, because following the release of the mitre gear unit from the mounting plate they can be extracted therewith from the roller hearth furnace. Advantageously on the side opposite to the mitre gear unit, the roller is removably inserted in a bearing device with a journal. Also on the side facing the mitre gear unit, mounting can consequently take place in the cool area and individual rollers can be removed in a particularly simple manner. The bearing device on the side opposite to the mitre gear unit can also be fixed to a mounting plate, which has a passage opening for the passage of the roller journal, the bearing device being sealed in an area surrounding the mounting plate passage opening with respect thereto. In the same way as for sealing on the side of the mitre gear unit, this displaces the sealing of the roller hearth furnace into the bearing device. As the roller journal is only inserted in the bearing device, there is no need for the sealing of the rotating parts, but it can be appropriate to render the journals accessible from an outside of the roller hearth furnace and then provide a radial shaft sealing ring as a seal on the bearing device.

According to a further development of the invention a bearing beam module has a mounting plate and between two and ten, particularly six mitre gear units connected to the mounting plate. The mounting plate is advantageously constructed so as to be adjustable relative to the roller hearth furnace side wall.

This leads to the advantages of a modular construction. All rollers connected to the bearing beam module can be jointly adjusted and e.g. also jointly removed.

According to a further development of the invention the drive journal and/or the journal has a bell-like, free end for receiving one roller end.

This permits a particularly simple, stress-free coupling of the rollers to the drive journals and journals. For example, the bell-like, free end is constructed as a slotted, resilient bell, so that the rollers are held under pretension in the bell. This type of coupling, which can take place in stress-free manner, is particularly advantageous for ceramic rollers. The double mounting by two spaced bearings of the drive journal and the journal in the mitre gear unit or in the bearing device also aids such a stress-free coupling.

According to the invention a roller hearth furnace is provided with an inventive driving apparatus, in which on two facing side walls of the roller hearth furnace there are in each case two mutually spaced cooling air ducts running parallel to the conveying direction in the roller hearth furnace, the mounting plate, bridging a gap between two cooling air ducts, being fixed thereto.

Therefore the cooling air ducts can be provided in a supporting component and ensure a further reduction of the temperatures to which the mitre gear units are exposed.

BRIEF DESCRIPTION OF THE DRAWINGS

Further features and advantages of the invention can be gathered from the attached claims and the description of a preferred embodiment of the invention in conjunction with the attached drawings, wherein show:

FIG. 1 A perspective, sectorwise view of a driving apparatus according to the invention.

FIG. 2 A perspective, sectorwise view of a bearing beam module of the driving apparatus of FIG. 1.

FIG. 3 A perspective view of a cross coupling piece of the driving apparatus of FIG. 1.

DETAILED DESCRIPTION OF THE INVENTION

Figure 4:
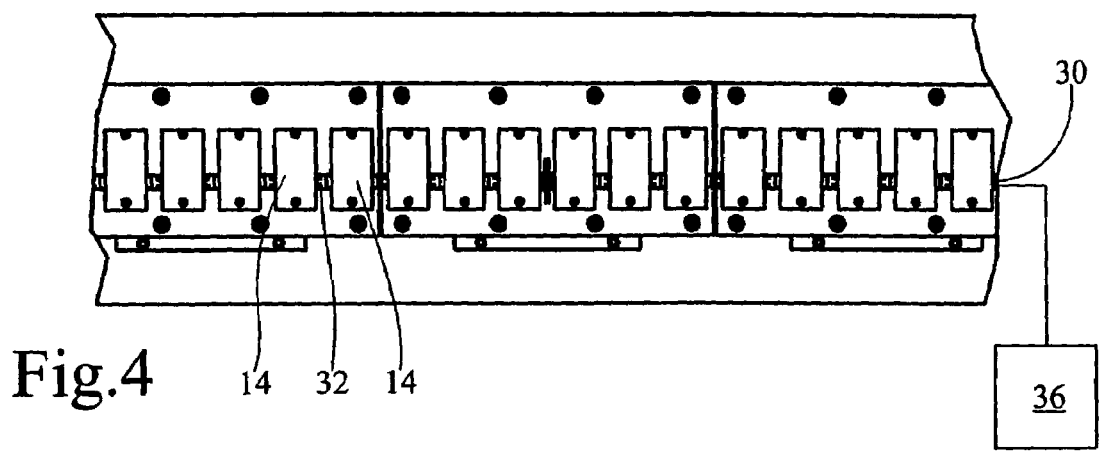
FIG. 4 A side view of the driving apparatus of FIG. 1.

The perspective, sectorwise view of FIG. 1 shows an inventive driving apparatus 10 in a not shown roller hearth furnace. The driving apparatus 10 is provided for rollers 12, which are arranged in mutually parallel manner and form a conveyor path through the roller hearth furnace. With each of the rollers 12 is associated a mitre gear unit 14, which are connected to a mounting plate 16a, 16b, 16c. There are six mitre gear units 14 on each mounting plate 16a, 16b, 16c. All the mitre gear units 14 on a particular mounting plate 16a, 16b, 16c form together with the latter a so-called bearing beam module.

The mounting plates 16a, 16b, 16c are in each case connected to a double beam, which forms part of a roller hearth furnace side wall 60 and has two parallel, mutually oriented rectangular tubes 20a, 20b running parallel to the conveying direction through the roller hearth furnace. The rectangular tubes 20a, 20b are mutually spaced and interconnected by connecting webs 22. The connecting webs are arranged in equidistantly spaced manner in the roller hearth furnace conveying direction and in the embodiment shown are positioned in such a way that there can in each case be six rollers between two connecting webs 22. Between two connecting webs 22 are also provided panels 24, which also interconnect the two rectangular tubes 20a, 20b and which in each case have six passage openings for the passage of the rollers 12. The rectangular tubes 20a, 20b are provided for the passage of cooling air.

The mounting plates 16a, 16b, 16c are in each case adjustably located on the beam 18. Therefore all six rollers of a bearing beam module can be jointly oriented and adjusted.

All the mitre gear units 14 shown in FIG. 1 are interconnected by means of rotary couplings, so that all the rollers 12 can only be jointly rotated.

It can be clearly gathered from FIG. 2 how the mitre gear units 14 are interconnected. Each mitre gear unit 14 has a casing, which is joined by two fastening screws 28 to the mounting plate 16a. On facing sides, in each case a stub shaft 30 projects from the casing of each mitre gear unit 14 and each stub shaft is provided with a slot extending through the shaft perpendicular to its axis. The casing of the mitre gear units 14 is parallelepipedic and the facing sides, from each of which projects a stub shaft 30, are parallel to one another and perpendicular to a conveying direction through the roller hearth furnace. Into the stub shafts 30 can be inserted a cross coupling piece 32, which connects the stub shaft 30 of a first mitre gear unit 14 to the facing stub shaft 30 of the adjacent mitre gear unit 14. The slots in the stub shafts 30 of a given mitre gear unit 14 are oriented parallel to one another.

In order to remove a mitre gear unit 14, as shown in FIG. 2, including an associated roller 12, it is consequently necessary for the slots in the stub shafts 30 to be oriented parallel to the mounting plate 16a, as shown in FIG. 2, so that by means of the cross coupling pieces 32 the slots in the stub shafts 30 of the two adjacent mitre gear units 14 pass perpendicular to the mounting plate 16a. As shown in FIG. 2, the mitre gear unit 14 can then be removed together with the two cross coupling pieces 32.

Alternatively the slots in the stub shafts 30 of the mitre gear unit 14 to be removed can be oriented perpendicular to the mounting plate 16a, so that the mitre gear unit 14 can then be removed without the two cross coupling pieces 32, which then in each case remain in the stub shafts 30 of the adjacent mitre gear units 14.

FIG. 3 is a larger scale view of a cross coupling piece 32. On facing sides the cross coupling piece 32 has two projections 34 with a strip-like construction and oriented perpendicular to one another. The strip-like projections 34 are constructed so as to match the slots in the stub shafts 30 of mitre gear units 14. As is apparent from FIG. 2, the projections 34 can be placed with a clearance in the slots of the stub shafts 30, but there is no need to fear that the cross coupling pieces 32 will drop out in the fitted state, because the two projections 34 are oriented perpendicular to one another.

The stub shafts 30 form rotary coupling pieces and two adjacent stub shafts 30 form together with a cross coupling piece 32 a rotary coupling. Said rotary coupling is constructed in such a way that it can compensate an angular displacement and/or a linear displacement between two adjacent mitre gear units 14. Such a displacement can e.g. result from tolerances of the mounting plate 16a.

The side view of FIG. 4 reveals the connection of adjacent mitre gear units 14 by in each case one cross coupling piece 32. As a result all the mitre gear units 14 are interconnected and the effect of a through drive shaft is obtained without having to suffer the disadvantages of a through, rigid drive shaft. As has already been stated a displacement between adjacent mitre gear units 14 can be compensated by means of the coupling between adjacent mitre gear units 14, in each case comprising rotary coupling pieces of two adjacent mitre gear units 14, corresponding in each case to a slotted stub shaft 30, as well as a cross coupling piece 32.

FIG. 4 diagrammatically shows a drive motor 36, which is e.g. connected to the stub shaft 30 of a first mitre gear unit 14.

Figure 5:
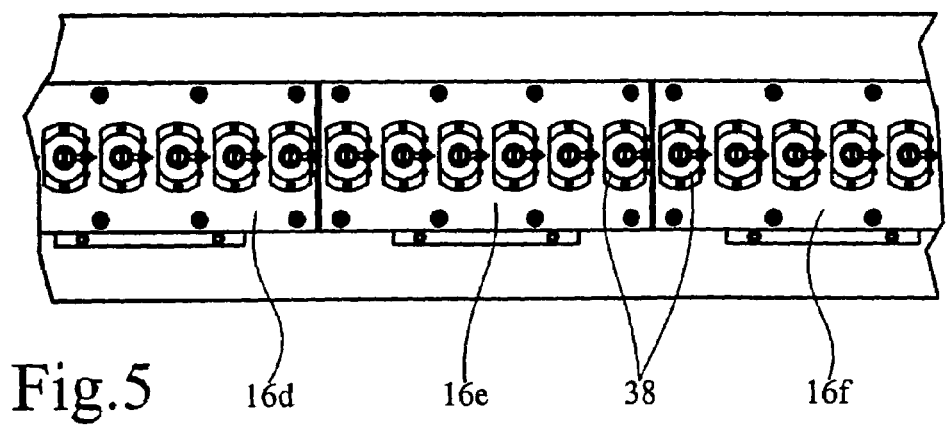
FIG. 5 A side view of the driving apparatus of FIG. 1 from the rear side concealed in FIG. 1.

The side view of FIG. 5 shows the arrangement of FIG. 1 from the rear, concealed side in FIG. 1. The free end of each roller is in each case mounted in a bearing device 38, said bearing devices 38 being fixed to mounting plates 16d, 16e, 16f, which are once again fixed to a double beam with rectangular tubes 20a, 20b. The double beam is constructed identically to the double beam on the facing drive side.

The mounting plates 16d, 16e, 16f are adjustable relative to the double beam, so that also all the rollers of a bearing beam module can be jointly adjusted. Optionally each bearing device 38, like each mitre gear unit 14, can be displaceable relative to the associated mounting plate 16d, 16e, 16f, so that each roller could be adjusted relative to adjacent rollers.

Figure 6:
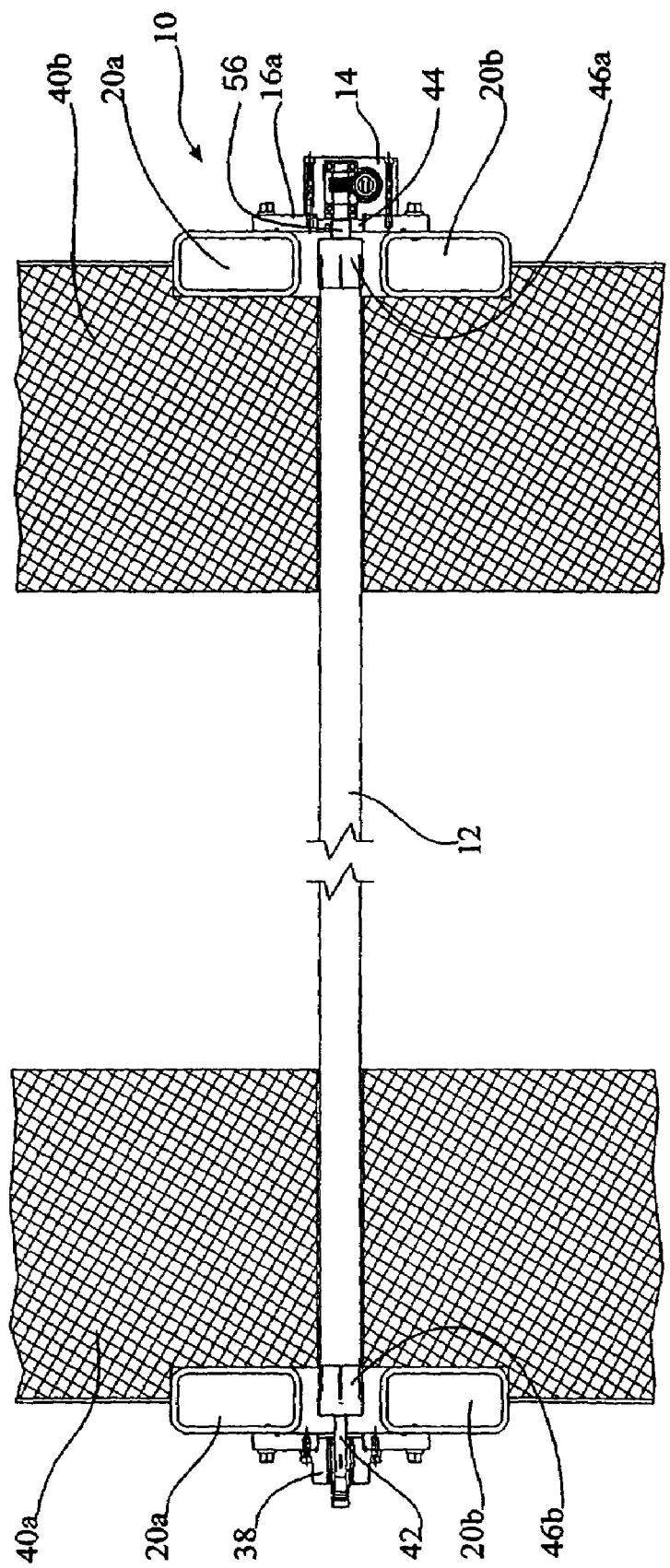
FIG. 6 A sectorwise sectional view of the driving apparatus of FIG. 6, a section taking place perpendicular to the conveying direction of the driving apparatus of FIG. 1.

The part sectional view of FIG. 6 is a section through the inventive roller hearth furnace with the driving apparatus 10 of FIG. 1.

It is firstly possible to see the double beams in each side wall 40a, 40b of the roller hearth furnace with in each case two rectangular tubes 20a, 20b. The rectangular tubes 20a, 20b are roughly half embedded in a given side wall 40a, 40b. As has already been stated, there is a cooling air flow through the rectangular tubes 20a, 20b, so that their temperature, at least on their outside remote from the side walls 40a, 40b, is much lower than the temperature of the actual side walls 40a, 40b.

FIG. 6 clearly shows that the roller 12 is inserted by means of a journal 42 into the bearing device 38. For the disassembly of a roller 12, it is merely necessary to release the associated mitre gear unit 14 from the associated mounting plate 16a and then the mitre gear unit 14 can be extracted together with the roller 12 from the roller hearth furnace, because the journal 42 is only inserted in the bearing device 38 and a passage opening 44 in the mounting plate 16a has a slightly larger diameter than the external diameter of the roller 12 or the external diameter of the roller holders.

The holders for the roller 12 are constructed at both free ends of said roller 12 in the form of a holding bell 46a, 46b. The holding bells 46a, 46b have several slots oriented parallel to the insertion direction of roller 12, so that with a corresponding choice of material one end of the roller 12 can be held by spring action in the holding bell 46. The drive-side holding bell 46a is connected by a not visible drive journal, which is connected by a rigid coupling to the mitre gear unit 14. The facing holding bell 46b is connected to the journal 42. As can be seen in FIG. 6, the journal 42 is held in the bearing device 38 by a double bearing. The drive journal is also rigidly joined to the drive shaft in mitre gear unit 14 and is also mounted by means of two spaced bearings in the sense of a double bearing. In the case of a precise orientation of bearing device 38 and mitre gear unit 14, it is consequently possible for roller 12 to be received in stressfree manner in holding bells 46a, 4b. This is particularly advantageous with ceramic rollers 12.

Figure 7:
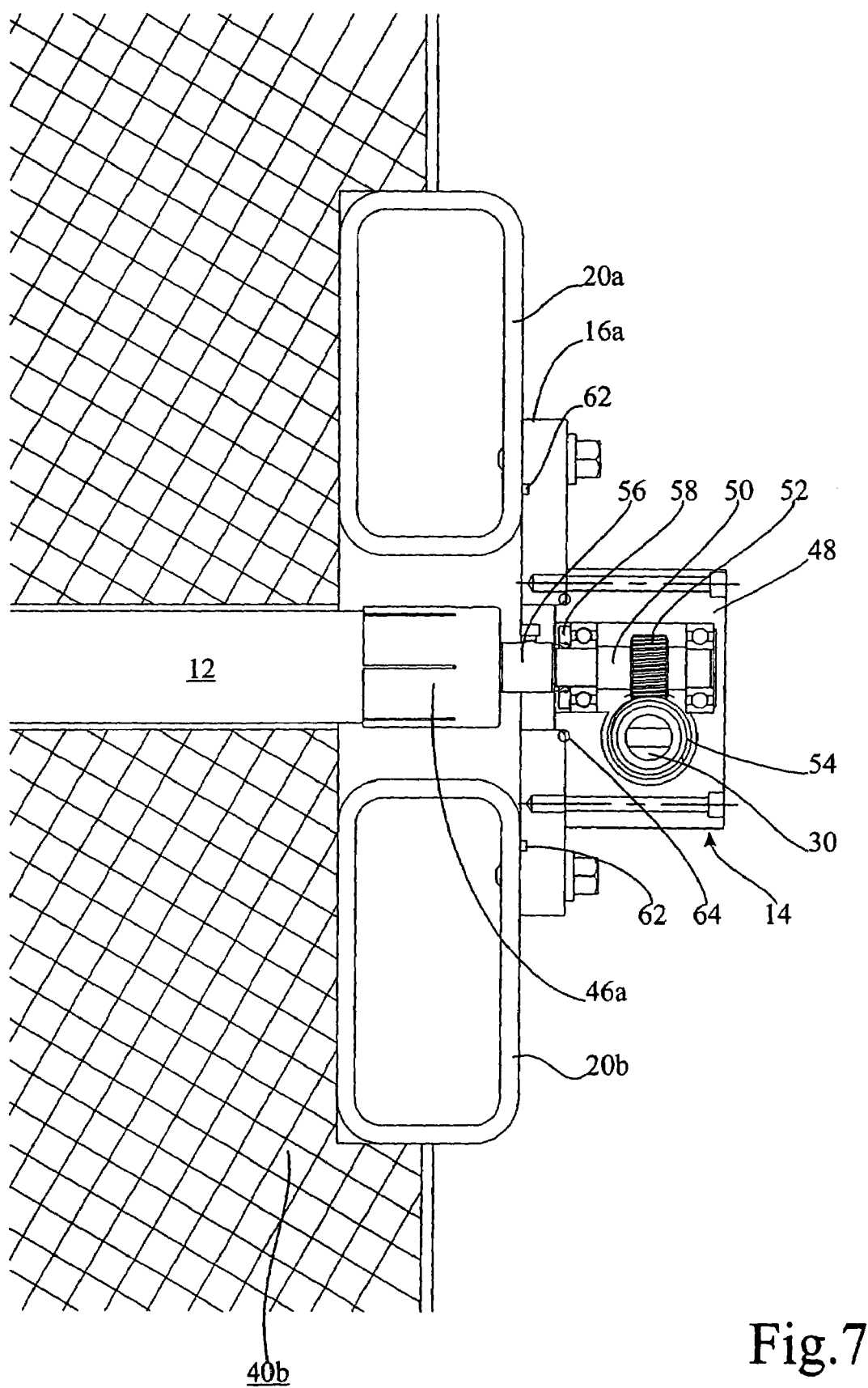
FIG. 7 A larger scale detail of the sectional view of FIG. 6.

The detail view of FIG. 7 precisely shows the construction of mitre gear unit 14. A gear 52 is connected to rotate on a drive shaft 50 with a casing 48 of mitre gear unit 14 and meshes with a worm 54 also mounted in casing 48. At both facing ends of the worm 54 is provided a stub shaft 30 projecting in each case from the casing 48 and which, as has already been stated, is provided with a slot running perpendicular to the shaft axis. The drive shaft 50 is mounted in casing 48 by means of two ball bearings to the right and left of gear 52. The drive journal of holding bell 46a for holding roller 12 is connected by means of a rigid coupling in the form of a collet 56 to the drive shaft 50. A radial shaft sealing ring 58 is provided at the exit point of drive shaft 50 from casing 48 of mitre gear unit 14. This radial shaft sealing ring 58 seals the drive shaft 50 against the interior of the roller hearth furnace. The radial shaft sealing ring 58 does not have to bring about a 100% seal, because the passage points of the stub shafts 30 through the side walls of casing 48 are sealed by suitable radial shaft sealing rings. A complete and substantially gastight sealing of casing 48 of mitre gear unit 14 consequently only takes place outside the roller hearth furnace and therefore in an area which is much cooler than the interior of said furnace and also compared with its side wall 40b.

In order to avoid an escape of gas at some other point, the mounting ring 16a is sealed by a circumferential seal 62 with respect to the double beam and specifically the rectangular tubes 20a, 20b. The circumferential 62 also seals mounting plate 16a with respect to the connecting webs 22 of FIG. 1. Casing 48 of mitre gear unit 14 is sealed by a sealing ring 64 with respect to mounting plate 16a. Thus, gas can only escape from the interior of the roller hearth furnace through the radial shaft sealing ring 58 in the interior of casing 48 of mitre gear unit 14. If the atmosphere of the roller hearth furnace contains aggressive gases, any harmful influences on the angle drive of the mitre gear unit 14 can be obviated by replacing a grease filling in casing 48 at regular maintenance intervals. As a result of the inventive sealing of casing 48 of mitre gear unit 14 relative to the roller hearth furnace and the displacement of the final angle drive seal into a cool area outside said furnace, a substantially gastight angle drive construction can be obtained without having to make extremely high demands with respect to thermal stability on the seal.

Figure 8:
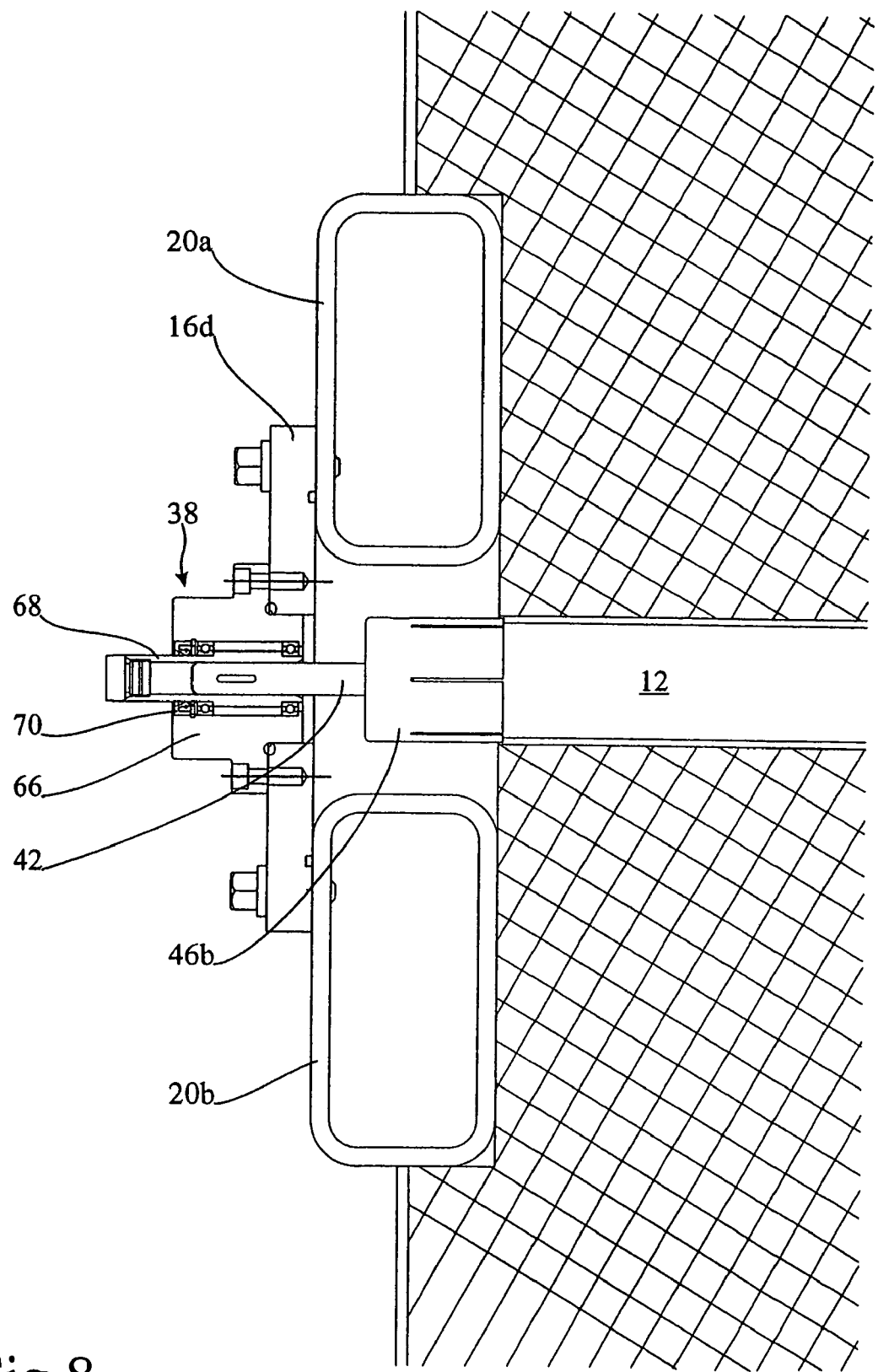
FIG. 8 A further larger scale detail of the sectional view of FIG. 6.

FIG. 8 shows in detail the bearing device 38 of FIG. 6. It is once again possible to see that, as on the drive side, a casing 66 of bearing device 38 is tightly engaged on the mounting plate 16d, which is once again fixed by a circumferential seal on the double beam using rectangular tubes 20a, 20b. The journal 42 with the holding bell 46b for roller 12 is inserted in a bearing bush 68, which is rotatably mounted by two ball bearings in casing 66. One end of the bearing bush 68 projects beyond the casing 66 of bearing device 38 and the passage of the bearing bush 68 through the outer wall of casing 66 is sealed by a radial shaft sealing ring 70. Thus, also on the bearing side, a sealing of the interior of the roller hearth furnace is displaced into a cooler area located outside the furnace side wall 60.

The invention claimed is:

1. Driving apparatus for rollers of roller hearth furnaces, with a bearing beam module having a mounting plate for fixing to a side wall of the roller hearth furnace, the mounting plate having at least one passage opening for receiving a drive journal for driving one of the rollers, wherein at least one mitre gear unit fixed to the mounting plate is provided and its angle drive is connected by means of the drive journal to the roller to be driven and which also has at least one first and one second rotary coupling piece which extend from inside a casing of the mitre gear unit through respective sides of the casing, terminating proximate said sides, and which are provided for connecting the angle drive to two further mitre gear units for driving in each case one adjacent roller.

2. Driving apparatus according to claim 1, wherein the first and second rotary coupling pieces are constructed for the compensation of an angular displacement and/or a linear displacement parallel and perpendicular to the conveying direction in the roller hearth furnace.

3. Driving apparatus according to claim 1, wherein the first and second rotary coupling pieces are located on opposite sides of the casing of the mitre gear unit.

4. Driving apparatus according to claim 3, wherein the first and second rotary coupling pieces are located on a front or rear side in the conveying direction through the roller hearth furnace.

5. Driving apparatus according to claim 1, wherein the first and second rotary coupling pieces are oriented substantially parallel to the conveying direction through the roller hearth furnace.

6. Driving apparatus according to claim 1, wherein the first rotary coupling piece and second rotary coupling piece have a stub shaft projecting from the mitre gear unit casing and which is centrally slotted perpendicular to an axis of the shaft.

7. Driving apparatus according to claim 6, wherein two rotary coupling pieces of adjacent mitre gear units can be connected by a cross coupling piece provided on opposite sides to the slots in the rotary coupling pieces with matching projections.

8. Driving apparatus according to claim 1, wherein the drive journal for driving the roller is connected to a gear located in the casing of the mitre gear unit and meshes with a worm located in the casing of the mitre gear unit and whose ends are connected to the first or second rotary coupling piece.

9. Driving apparatus, particularly according to claim 1, for rollers of roller hearth furnaces, with a bearing beam module having a mounting plate for fixing to a side wall of the roller hearth furnace, the mounting plate having at least one passage opening for receiving a drive journal for driving one of the rollers, wherein at least one mitre gear unit fixed to the mounting plate is provided and by means thereof the associated free end of the roller is driven, the casing of the mitre gear unit being given a substantially gastight construction and in an area surrounding the passage opening mounting plate is sealed with respect thereto.

10. Driving apparatus according to claim 9, wherein the free end of the roller is mounted by means of the mitre gear unit.

11. Driving apparatus according to claim 1, wherein the passage opening in mounting plate has a larger diameter than roller and the mitre gear unit is constructed so as to be removable together with roller.

12. Driving apparatus according to claim 1, wherein on the side opposite to the mitre gear unit, the roller is removably inserted together with a journal in a bearing device.

13. Driving apparatus according to claim 12, wherein the bearing device is fixed to a mounting plate, which has a passage opening for the passage of journal of roller, the bearing device in an area surrounding the passage opening of the mounting plate being sealed with respect thereto.

14. Driving apparatus according to claim 1, wherein a bearing beam module has a mounting plate and between two and ten, particularly six mitre gear units connected to the mounting plate.

15. Driving apparatus according to claim 14, wherein the mounting plate is constructed adjustably relative to the roller hearth furnace side wall.

16. Driving apparatus according to claim 1, wherein the drive journal and/or journal has a bell-like, free end for receiving one end of a roller.

17. Roller hearth furnace with a driving apparatus for rollers according to claim 1, wherein on two facing side walls of the roller hearth furnace are in each case provided two mutually spaced cooling air ducts parallel to the conveying direction in the roller hearth furnace, the mounting plate, bridging a gap between two cooling air ducts, being fixed thereto.

* * * * *